Feb. 15, 1972 — M. ESTRADA — 3,642,969

PROCESS FOR CURING CONCRETE IN SITU BY MEANS OF VAPOR

Filed Jan. 15, 1970 — 4 Sheets-Sheet 1

INVENTOR
MANUEL ESTRADA

BY
ATTORNEY

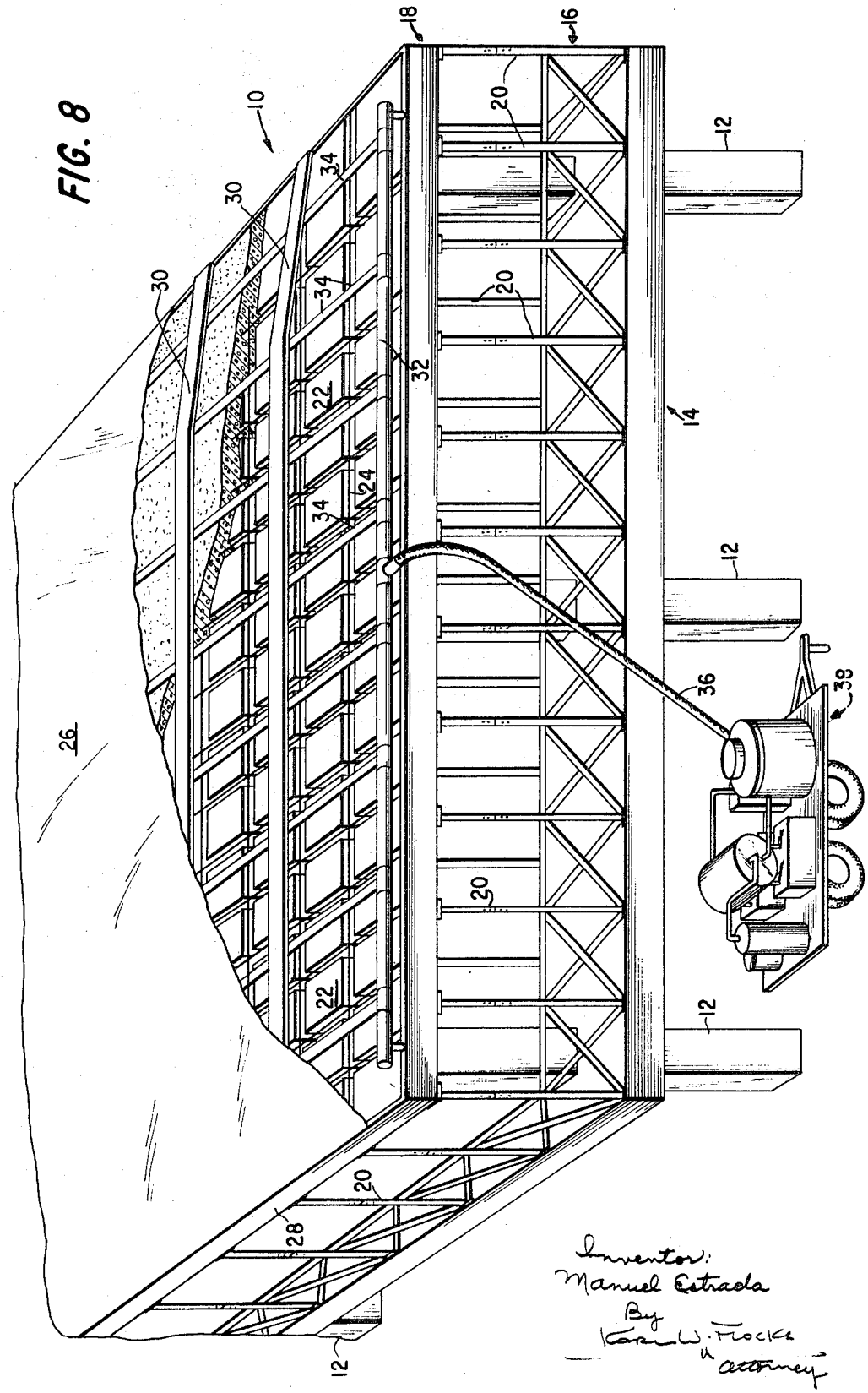

United States Patent Office 3,642,969
Patented Feb. 15, 1972

3,642,969
PROCESS FOR CURING CONCRETE IN SITU BY MEANS OF VAPOR
Manuel Estrada, Mexico City, Mexico
(Insurgentes Sur 408–8 Col. Roma, Mexico)
Continuation-in-part of application Ser. No. 622,024, Mar. 8, 1967. This application Jan. 15, 1970, Ser. No. 3,049
Int. Cl. C04b 15/12
U.S. Cl. 264—82                     4 Claims

ABSTRACT OF THE DISCLOSURE

A method for accelerating the curing of concrete in situ comprising pouring concrete into forms; spreading a flexible sheet over the uncured concrete in the forms; and introducing steam from a portable steam generator into the space between the uncured concrete and the flexible sheet. Steam is introduced, under pressure, until the concrete mass has achieved an average temperature of about 77° C. at which time the introduction of steam is suspended and the exothermic heat of reaction cures the concrete at an accelerated rate.

---

This application is a continuation-in-part of applicant's copending application Ser. No. 622,024, filed Mar. 8, 1967, now abandoned.

DISCUSSION OF PRIOR ART

The introduction of heat and/or steam for the purpose of preventing freezing of a poured concrete structure before the concrete is properly set, or for the purpose of curing concrete blocks, for example, is generally known in the art as illustrated, by way of example only, by the patents to Ransome, 652,732; Hatch, 1,482,187; Weaver, 1,704,156; and Wilson, 2,886,876.

BACKGROUND OF THE INVENTION

In recent years, through the use of reinforced and prestressed concrete, prefabricated stair-well units, etc., the production of "skyscraper" buildings has involved radical changes. Particular "slowing" factors in producing a plurality of floors of a poured building involve a loss of time due to setting of the concrete sufficiently to enable the builder to reuse the forms and proceed with subsequent steps consistent with complete of the floor, ceiling, etc. Although builders were aware that during low temperatures precautions had to be taken to insure against freezing (which prevented proper curing or setting of the concrete), and "fast curing" cements have been proposed (which are more expensive than conventional cements), nevertheless, due to emergency conditions encountered prior to the 1968 Olympic Games held in Mexico City, Mexico, it was apparent that if conventional practices were utilized to produce the many planned concrete building constructions, they would not be completed in time for housing, the sports events, etc.

Although the temperature in Mexico City, Mexico, is relatively temperate and, therefore, precautions did not have to be taken to prevent freezing of the water in concrete constructions, applicant concluded that early curing of the concrete should be accomplished in order to permit building construction to be expedited and yet conventional tests for strength of materials had to be adhered to in order to maintain safety standards.

OBJECTS OF THE INVENTION

A primary object of the present invention is to provide a novel method or process for curing poured concrete at a building site wherein curing is expedited and the resulting concrete structure is of a high quality acceptable under all standards.

A more particular object of the present invention is to provide a novel process in which a horizontal poured structure or the like, after having been poured, is peripherally enclosed by an overlying, flexible covering sheet, and steam is introduced by means of a portable steam generator beneath the covering sheet to inflate or buoy the flexible covering sheet, and steam is continuously introduced until the slab is cured, much earlier than had been possible in the past or had been believed to be possible according to techniques and technical standards known according to the prior art.

A more particular object of the present invention is to provide a novel method of the character set forth above in which steam-treated concreted walls have reached such an early strength that forms can be removed at an average of approximately twelve hours of aging, thus facilitating subsequent building operations and reuse of the forms to expedite erection of the building.

These, together with other and more particular objects and advantages, will become apparent from a consideration of the following description when taken in conjunction with the drawing forming a part hereof wherein:

FIG. 8 is a fragmentary perspective illustrating a partially constructed portion of a building, with portions broken away to illustrate the steps of the method of the invention.

Figure 1:
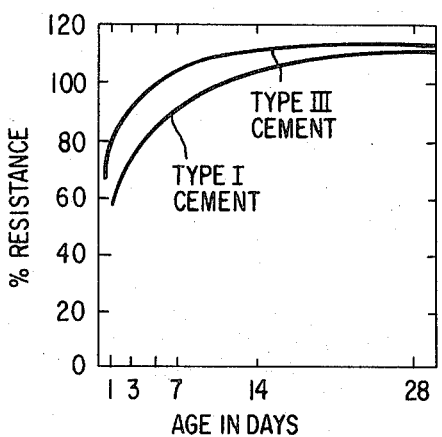
FIG. 1 is a graphical illustration showing relative age-strengths between Type 1 and Type 3 cements.

Referring to the drawing in detail, and first considering FIG. 8, a fragmentary portion of a building is indicated generally at 10 and comprises a plurality of spaced vertical columns 12 which support a first, already-poured floor indicated generally at 14 from which extends form-support structure indicated generally at 16 which supports a second floor indicated generally at 18.

It will be appreciated that the floor 14 was poured by means of suitable forms or form sections conventionally described as "pans" and this floor 14 was produced according to the method of the invention.

After the floor 14 had been poured and set, it was rapidly cured according to the method of the invention permitting the forms to be reused or removed approximately twelve hours after aging of the poured floor 14.

Thereafter, the form-support structure 16, which comprises a plurality of vertically-extending, suitably integrated brace elements 20 have suitably secured thereon a plurality of forms or pans 22 which will have incorporated in trough portions thereof reinforcing bars 24 (preferably prestressed) as is conventional. It will be apparent to those skilled in the art that after the floor is poured on the forms 22 and reinforcing bars 24, and is suitably set after a considerable length of time, the support structure 16 is removed and the pans will be removed from beneath the set-up and poured floor.

It will be understood that although the drawing in FIG. 8 shows a portion broken away to illustrate the pans 22 and reinforcing rod 24, nevertheless, all of the forms will have received thereon a concrete slab which has not as yet set or cured.

Substantially immediately after the slab has been poured, a flexible sheet of canvas, plastic (such as polyethylene), etc., 26 is peripherally sealed at 28 about the slab to substantially seal steam therein. The flexible sheet 26 is supported (approximately one foot above the slab) by means of suitable bridging elements 30, for example, and a steam-emitting manifold 32 including branch conduits 34 have a plurality of openings for emitting steam beneath the flexible sheet 26.

The manifold 32 is connected to a flexible conduit 36 which in turn communicates with a portable, suitable-capacity steam generator 38.

After steam has been introduced, under pressure, beneath the flexible sheet 26 which is peripherally sealed about the slab, the concrete is subjected to heated moisture vapor at its upper surface, accordingly accelerating a rate of cure for even Type 1 cement (standard conventional type having a normal cure rate) obviating the necessity for the use of Type 3 cements (early or rapid cure type cements which are relatively more expensive).

Utilization of the method described permits the forms to be removed after approximately twelve hours of aging when the concrete has attained approximately the same strength characteristics as that afforded by approximately fourteen days of aging of Type 3 cement or twenty-one days of aging for Type 1 cement, assuming that twenty-eight days' aging strength is considered to be conventional under conventional curing conditions.

The method described affords the advantages of a rapid construction from less capital investment and an earlier recoupment of invested capital; further savings are afforded since less capital has to be invested for frame supports which can be reused after a twelve-hour interval (under normal conditions the frame-supports must remain in position for at least seven days).

Normal strength Type 1 cements can be utilized instead of the earlier-strength Type 3 cements, the latter being much more expensive than normal-strength Type 1 cements.

With the more rapid production of the slabs being poured, commensurate economies are achieved in labor and overhead.

Additionally, when pouring slabs at relatively low temperatures, the use of early-cure type cements can be eliminated, since applicant's method affords an early set obviating freezing of the water before chemical action has taken place with the cement in the concrete mix.

By using applicant's method more adequate quality control of the various slabs is attained since erratic curing is eliminated due to exposed compass location of the various portions of the slab, i.e., those exposed to southern exposure in sun as compared with those facing the north and perhaps being exposed to a relatively cold wind.

Referring to FIGS. 1–7b, applicant graphically illustrates the test data related to Type 1 and Type 3 cements, as well as the effect of applicant's method under varying conditions.

It should be borne in mind that applicant's method involves curing at the site of a construction through the direct application of steam to a poured slab in which the owner of the construction as well as the contractor are afforded unusual benefits in strength of the structure and economy through the use of normal cements which in no manner is contemplated under ordinary curing conditions even when using relatively expensive quick-curing or quick-setting cements and/or cements particularly adapted for freezing conditions. It is particularly significant that through applicant's novel method the forms can be struck after approximately twelve hours of aging (even when using normal cements), thus assuring early reuse of forms and form-supports.

There are many factors influenced by curing utilizing applicant's method, and it is particularly significant to relate these factors to the resistance of the concrete being produced. Tests have been effected to determine the principal factors influenced by curing the concrete slabs through the utilization of applicant's method.

Figure 2A:
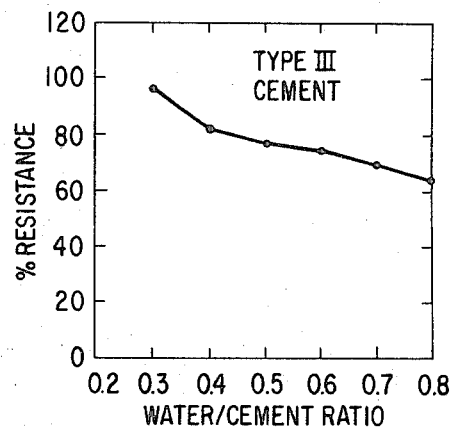
FIGS. 2a and 2b are graphical illustrations of Types 3 and 1 cements, respectively, illustrating the relative strengths in relation to the water/cement ratios.
Figure 2B:
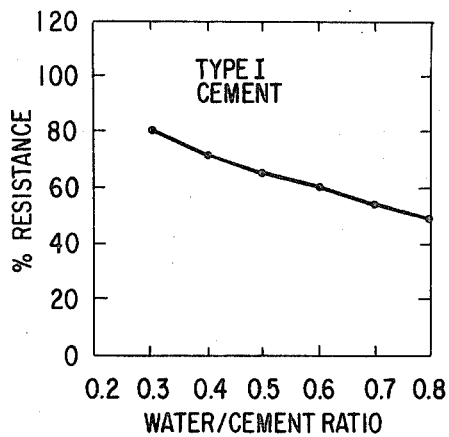
Figure 3:
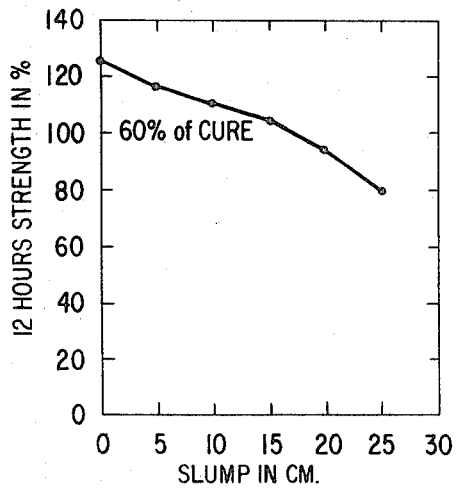
FIG. 3 is a graphical illustration of a conventional slump test.

In FIG. 1, it will be observed that Type 3 cement contains an earlier strength than Type 1 cement. In FIGS. 2a and 2b, it will be noted that strengths are increased when the ratio of water to cement is reduced. In FIG. 3, the slump of a mixture is plotted in relation to the number of curing days.

Figure 4:
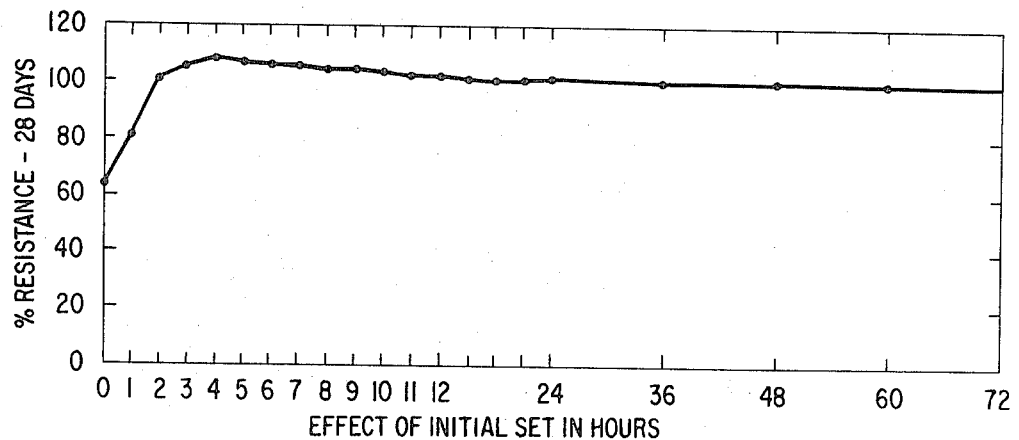
FIG. 4 is a graphical illustration showing the relative strength of concrete in relation to the time in hours when utilizing the method of the invention.

In FIG. 4, the percentage of resistance or strength is plotted in relation to the strength of a slab subjected to steam injection according to the method of the application. It should be noted that during approximately the first two hours, steam wil lnot be or should not be introduced, and according to the present invention and the disclosure, this time is normally utilized to install the steam manifold and flexible sheet.

Figure 5A:
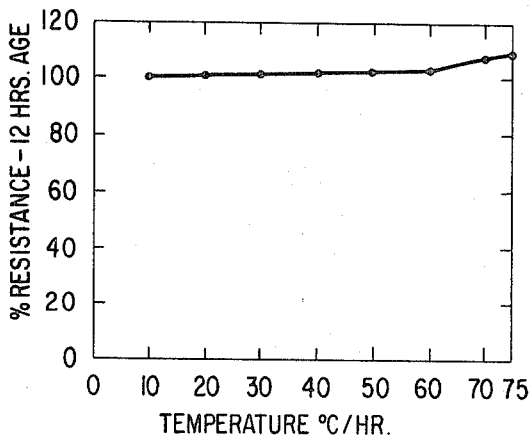
FIGS. 5a and 5b are graphical illustrations of the strength of concrete in relation to temperature changes in degrees centigrade.
Figure 5B:
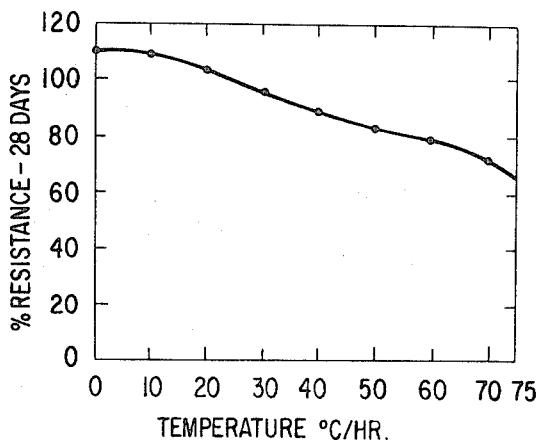
Figure 6A:
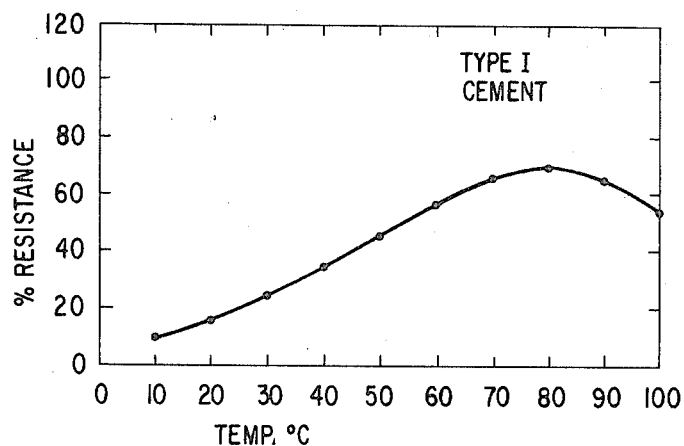
FIGS. 6a and 6b are graphical illustrations with the relative strengths of Type 1 and Type 3 cements during aging.
Figure 6B:
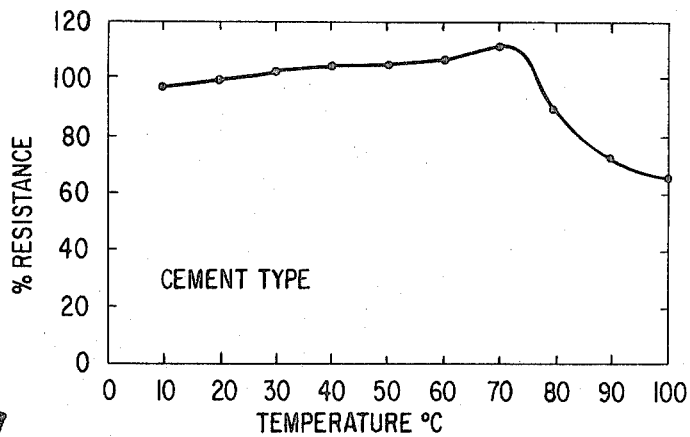
Figure 7A:
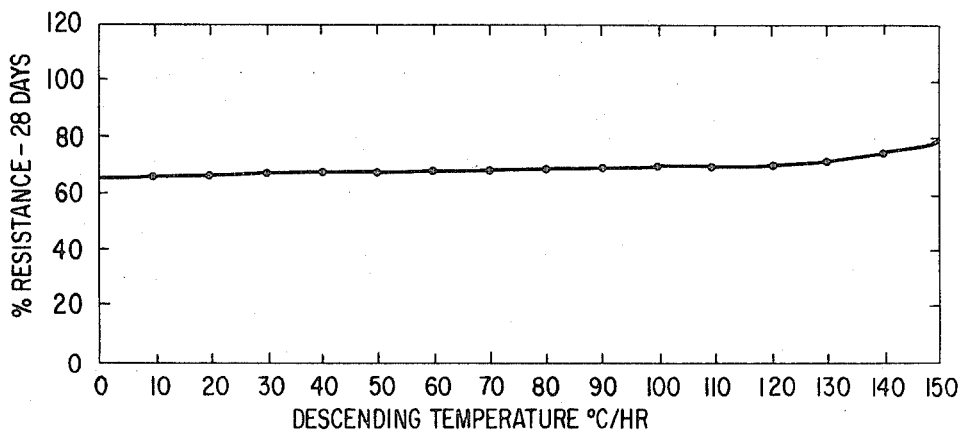
FIGS. 7a and 7b are graphical illustrations showing the strength of the mix in relation to descending temperatures in degrees centigrade per hour.
Figure 7B:
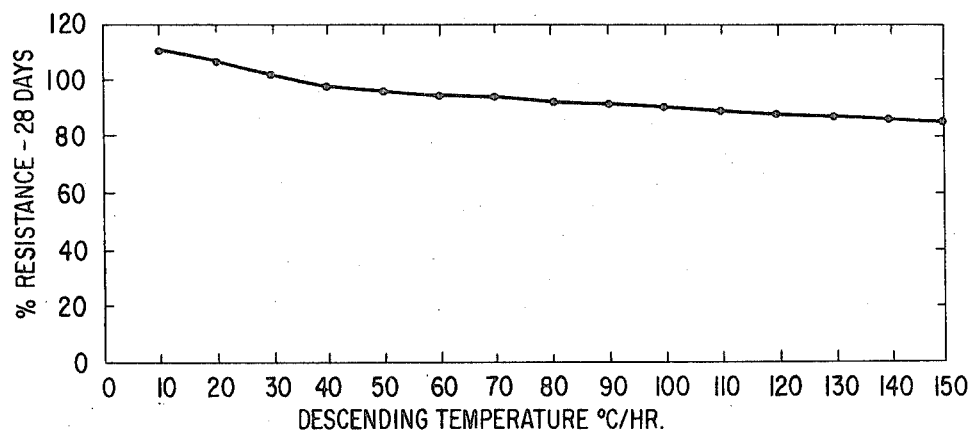

FIGS. 5a and 5b graphically illustrate the effect of a rising temperature on the curing of concrete, FIGS. 6a and 6b graphically illustrate the maximum temperature effect with respect to Type 1 and Type 3 cements, and FIGS. 7a and 7b illustrate the effect of temperature reduction for the respective types of cement.

It will be observed that the graphical illustrations of FIGS. 7a and 7b illustrate the effect of temperature re- or steam cure of the present method in relation to concrete resistance, this data having been obtained as the result of tests on more than 2500 cylinders of concrete 15 x 30 centimeters and manufactured for use directly in constructions produced according to A.S.T.M. standards.

According to the method described above and the graphical data obtained, certain standards have been established according to the method of the present invention.

Briefly in review, the method basically consists of producing a steam chamber above an uncured concrete slab directly at the site of construction. A portable steam generator is readily located at the construction site, and sufficient canvas or polyethylene sheets are oriented above the uncured slab and perforated pipe or a steam manifold are placed into position.

As soon as the concrete slab has been poured, installation of the steam system and the flexible sheet material takes place, the flexible sheet being maintained above the uncured slab at approximately one foot maximum. As mentioned before, the installation of the chamber above the uncured slab will probably involve the initial two hours after completion of the slab, which should be permitted to lapse according to the graphical illustration of FIG. 4.

Suitable temperature controls are utilized both in the concrete and in the steam chamber, i.e., thermocouples or the like. The application of steam will be in relation to the number of cubic centimeters of concrete poured, the ambient temperature, and with the application of steam being maintained until the optimum temperature to be reached in the concrete has been attained; see FIGS. 5a and 5b, and after the optimum temperature has been reached, steam introduction is suspended.

After steam introduction is suspended the forms are maintained in position approximately six hours, and thereafter the steam chamber is dismantled and cylinders (which have been disposed in the steam chamber) are tested in the laboratory.

The elapsed time will be approximately 14 to 16 hours before the laboratory report is completed. At this time, the concrete slab, after approximately 14 to 16 hours (when subjected to applicant's method) will have about 60% the strength of a conventional test cylinder after 28 days of cure for a Type 1 cement, and about 70% strength of a conventional cylinder after 28 days of cure in the case of a Type 3 cement, these strengths being sufficient and permitting striking of the concrete forms preliminary to installation of forms for the next or succeeding floor slabs.

According to applicant's method, steam will not be initiated until approximately two hours have elapsed after the finishing of a pour;

The temperature will not be raised more than 23° C. per hour;

The maximum temperature of the concrete slab will not exceed approximately 77° C.;

The temperature will not be lowered, once a cure has been completed, more rapidly than 33° C. per hour;

The maximum steam pressure will be approximately 4.5 kilograms per centimeter square;

The cured concrete will be tested for resistance through the use of standard test cylinders prepared according to A.S.T.M. standards, and no succeeding floor slabs will be initiated until cylinders being tested indicate that the concrete slab has reached minimum strength requirements;

The slab will be considered to be sufficiently cured when the standard cylinders indicate that a normal Type 1 cement has attained 60% cure strength based upon a 28-day cure, or 70% cure strength for a 28-day period in the case of Type 3 cement.

According to applicant's method, not only are strict controls of the construction and quality maintained, but unusual economies and advantages are afforded.

What is claimed is:

1. The method of accelerating the erection of a building on site comprising the steps of:
   (a) erecting forms to produce a horizontally disposed floor slab;
   (b) pouring concrete into said forms;
   (c) spreading a loose, flexible covering sheet of material over the poured, uncured slab and peripherally sealing the covering sheet about the periphery of said slab;
   (d) providing a portable steam generator at the building site and generating steam at the building site;
   (e) permitting the poured concrete of the uncured slab to cure substantially two hours;
   (f) introducing steam from the generator under pressure, beneath said flexible covering sheet and above the poured and uncured slab and at a pressure sufficient to inflate or buoy the flexible covering sheet above the slab; and
   (g) continuously introducing steam until the poured slab attains a temperature in the order of about a maximum of 77° C. at which time the introduction of steam is suspended and the slab is cured at an accelerated rate and removing the forms long before they can be removed during setting and curing of the slab in the absence of the pressurized steam above the slab.

2. The method as claimed in claim 1 in which the temperature of the uncured slab, through the introduction of steam, is not raised more than 23° per hour.

3. The method as claimed in claim 1 in which the temperature is reduced, at no rate greater than 33° C. per hour.

4. The method as claimed in claim 1 in which said concrete is produced from a Type 1 concrete and the forms are not removed until the slab is cured wherein a conventional cylinder according to A.S.T.M. standards has attained 60% of a 28-day strength.

References Cited

UNITED STATES PATENTS

| | | | |
|---|---|---|---|
| 2,442,730 | 6/1948 | Whittenberg | 264—31 X |
| 2,886,876 | 5/1959 | Wilson | 25—Curing Digest |
| 2,170,936 | 8/1939 | Baron | 264—82 |

ROBERT F. WHITE, Examiner

T. P. PAVELKO, Assistant Examiner

U.S. Cl. X.R.

264—333, Digest 43